United States Patent [19]
Ratzel et al.

[11] Patent Number: 6,080,097
[45] Date of Patent: Jun. 27, 2000

[54] CUSHIONING CONVERSION MACHINE WITH SINGLE FEED/CUT MOTOR

[75] Inventors: Richard O. Ratzel, Westlake; James A. Simmons, Jr, Painesville Township, both of Ohio

[73] Assignee: RanPak Corp., Painesville Township, Ohio

[21] Appl. No.: 08/986,525

[22] Filed: Dec. 8, 1997

Related U.S. Application Data

[63] Continuation of application No. PCT/US96/09092, Jun. 6, 1996, which is a continuation-in-part of application No. 08/478,256, Jun. 7, 1995, abandoned.

[51] Int. Cl.[7] .............................. B31D 5/00; B23Q 5/34; B31F 1/10
[52] U.S. Cl. .................. 493/359; 493/346; 493/351; 493/464; 493/967
[58] Field of Search ...................... 493/464, 967, 493/346, 359, 356, 351, 350, 349, 357

[56] References Cited

U.S. PATENT DOCUMENTS

| | | |
|---|---|---|
| 1,569,569 | 1/1926 | Pels . |
| 1,571,594 | 2/1926 | Lorenz ................................ 493/464 |
| 1,958,132 | 5/1934 | Davis . |
| 2,101,170 | 12/1937 | Engel .................................. 493/464 |
| 2,208,966 | 7/1940 | Eickman . |
| 2,494,413 | 1/1950 | Slettengren . |
| 2,569,589 | 10/1951 | Trissell . |
| 2,882,802 | 4/1959 | Walker . |
| 3,137,189 | 6/1964 | Raskin .................................. 83/205 |
| 3,466,959 | 9/1969 | Wharton ............................... 83/205 |
| 3,509,797 | 5/1970 | Johnson . |
| 3,524,301 | 8/1970 | Zimmerman ......................... 53/167 |
| 3,583,295 | 6/1971 | Elder et al. . |
| 3,603,216 | 9/1971 | Johnson . |
| 3,613,522 | 10/1971 | Johnson . |
| 3,645,157 | 2/1972 | Di Giulio et al. . |
| 3,650,877 | 3/1972 | Johnson . |
| 3,655,500 | 4/1972 | Johnson . |
| 3,672,252 | 6/1972 | Symonds . |
| 3,695,133 | 10/1972 | Finke . |
| 3,710,667 | 1/1973 | Kluger ................................. 83/203 |
| 3,735,445 | 5/1973 | Jurcak . |
| 3,738,212 | 6/1973 | Goodale . |
| 3,799,039 | 3/1974 | Johnson . |
| 3,817,139 | 6/1974 | Desai et al. . |
| 3,941,021 | 3/1976 | Meinholdt . |
| 4,026,198 | 5/1977 | Ottaviano . |
| 4,047,811 | 9/1977 | Allis et al. . |
| 4,073,375 | 2/1978 | Hart et al. ........................... 198/466 |
| 4,085,662 | 4/1978 | Ottaviano . |
| 4,109,040 | 8/1978 | Ottaviano . |
| 4,188,257 | 2/1980 | Kirkpatrick . |
| 4,237,776 | 12/1980 | Ottaviano . |
| 4,367,666 | 1/1983 | Toth . |

(List continued on next page.)

FOREIGN PATENT DOCUMENTS

| | | |
|---|---|---|
| 529 457 A1 | 3/1993 | European Pat. Off. . |
| 934 766 | 5/1994 | Finland . |
| 274-188-A | 10/1989 | Germany . |
| 494645 | 10/1938 | United Kingdom . |
| 638877 | 6/1950 | United Kingdom . |
| 736469 | 9/1955 | United Kingdom . |

*Primary Examiner*—James F. Coan
*Attorney, Agent, or Firm*—Renner, Otto, Boisselle & Sklar, L.L.P.

[57] ABSTRACT

A pair of clutches selectively transmit power to a coining mechanism and to a cut-off mechanism in a paper converting machine. As sheet-like material is advanced through the machine, it is formed into a three dimensional strip of padding by a forming mechanism. Next the strip is coined or otherwise secured to keep its three dimensional shape by a coining mechanism. Thereafter the strip is cut into sections of the desired length by a cut-off mechanism. Advantageously, both the coining mechanism and the cut-off mechanism are powered by a single motor, then are selectively connected to the motor by a pair of clutches. The clutches may be wrap spring clutches, and the clutch controlling power to the cut-off mechanism may be a single revolution clutch.

19 Claims, 6 Drawing Sheets

U.S. PATENT DOCUMENTS

| | | | |
|---|---|---|---|
| 4,410,315 | 10/1983 | Frye | 493/464 |
| 4,510,841 | 4/1985 | Farran et al. . | |
| 4,557,716 | 12/1985 | Ottaviano . | |
| 4,619,635 | 10/1986 | Ottaviano . | |
| 4,650,456 | 3/1987 | Armington . | |
| 4,699,609 | 10/1987 | Komaransky et al. . | |
| 4,717,613 | 1/1988 | Ottaviano . | |
| 4,726,260 | 2/1988 | Lovrenich et al. . | |
| 4,750,896 | 6/1988 | Komaransky et al. . | |
| 4,839,210 | 6/1989 | Komaransky et al. . | |
| 4,884,999 | 12/1989 | Baldacci . | |
| 4,912,910 | 4/1990 | Lowe et al. | 493/967 |
| 4,937,131 | 6/1990 | Baldacci et al. . | |
| 5,042,345 | 8/1991 | Hawkins et al. . | |
| 5,123,889 | 6/1992 | Armington et al. . | |
| 5,149,075 | 9/1992 | Crowley et al. | 493/357 |
| 5,188,581 | 2/1993 | Baldacci . | |
| 5,203,761 | 4/1993 | Reichental et al. | 493/967 |
| 5,292,238 | 3/1994 | Michalak | 53/516 |
| 5,322,477 | 6/1994 | Armington et al. . | |
| 5,558,923 | 9/1996 | Vesamas . | |
| 5,656,008 | 8/1997 | Beierlorzer | 493/967 |
| 5,674,172 | 10/1997 | Armington et al. | 493/29 |
| 5,688,578 | 11/1997 | Goodrich | 493/967 |

CUSHIONING CONVERSION MACHINE WITH SINGLE FEED/CUT MOTOR

RELATED APPLICATION DATA

This application is a continuation of International application No. PCT/US96/09092 filed Jun. 6, 1996, which is a continuation in part of U.S. Pat. application No. 08/478,256 filed Jun. 7, 1995 and now abandoned.

FIELD OF THE INVENTION

The invention herein described relates generally to cushioning conversion machines and more particularly to a drive system for powering the cut-off and feed/connecting mechanisms of such machines.

BACKGROUND OF THE INVENTION

In the process of shipping an item from one location to another, a protective packaging material is often placed in the shipping container to fill any voids and/or to cushion the item during the shipping process. Some commonly used protective packaging materials are plastic foam peanuts and plastic bubble pack. While these conventional plastic materials seem to perform adequately as cushioning products, they are not without disadvantages. Perhaps the most serious drawback of plastic bubble wrap and plastic foam peanuts is their effect on our environment. Quite simply, these plastic packaging materials are not biodegradable and thus they cannot avoid further multiplying our planet's already critical waste disposal problems. The non-biodegradability of these packaging materials has become increasingly important in light of many industries adopting more progressive policies in terms of environmental responsibility.

The foregoing and other disadvantages of conventional plastic packaging materials have made paper protective packaging material a very popular alternative. Paper is biodegradable, recyclable and renewable; making it an environmentally responsible choice for conscientious shippers.

While paper in sheet form could possibly be used as a protective packaging material, it is usually preferable to convert the sheets of paper into a relatively low density pad-like cushioning or dunnage product. This conversion may be accomplished by a cushioning conversion machine, such as that disclosed in commonly assigned U.S. Pat. No. 5,123,889. The conversion machine disclosed in U.S. Pat. No. 5,123,889 converts sheet-like stock material, such as paper in multi-ply form, into relatively low density pads. Specifically, the machine converts this stock material into a continuous unconnected strip having lateral pillow-like portions separated by a thin central band. This strip is coined along its central band to form a coined strip which is cut into sections, or pads, of a desired length. The stock material preferably consists of three superimposed webs or layers of biodegradable, recyclable and reusable thirty-pound Kraft paper rolled onto a hollow cylindrical tube. A thirty-inch wide roll of this paper, which is approximately 450 feet long, weighs about 35 pounds and will provide cushioning equal to approximately sixty cubic feet of plastic foam peanuts while at the same time requiring less than one-thirtieth the storage space.

The converting machines known in the prior art, including the one shown in U.S. Pat. No. 5,123,889, have utilized two drive motors, one to power the feed/connecting assemblies and one to power the assembly which cuts the strip into the desired lengths. In machines of the type shown in the aforesaid patent, a controller has been used to stop and start the feed motor for producing a length of the strip of dunnage while a clutch selectively connected the continuously running cut motor to actuate a cutting blade for cutting off a section of the strip.

SUMMARY OF THE INVENTION

The present invention provides a drive mechanism for a converting machine that utilizes a single drive motor which operates continuously and a pair of clutches to selectively engage the feed/connecting and cut-off mechanisms. This new arrangement is less expensive to build because only a single motor is required, is easier to maintain because synchronization of the feed/connecting and cut-off operations is easier to maintain, and is easier to ship and handle because it is lighter and smaller than the prior art devices.

Accordingly, the present invention provides a method and apparatus for converting sheet-like material into dunnage. The apparatus includes a converting machine for converting sheet-like stock material into a cushioning product, comprising a forming assembly to form sheets of paper into a three dimensional strip of padding and a mechanism to advance the paper through the forming assembly and to secure the paper in the three dimensional pad configuration. The invention also includes an assembly to cut the resulting strip of padding into a series of pads of the desired length. The mechanism has a drive motor connected to first and second clutches. The first clutch is operatively connected to coining gears which advance paper through the machine to form it into a pad while at the same time coining the pad to keep the paper in the shape to which it has been formed by the forming assembly. The second clutch is connected to a cutoff mechanism to cut the formed paper into pads of the desired length. A controller is used to selectively actuate the two clutches.

This arrangement reduces costs by requiring only a single motor, and increases reliability since the motor runs continuously. Moreover the converting machine is lighter and smaller than the prior art machines, making it less expensive to ship to customers.

In a preferred embodiment, the clutches may be wrap spring clutches, or other suitable electromagnetic clutches. Further, the coining gears may be located to receive the strip of padding as it leaves the forming assembly. The cut-off mechanism may include a knife which is actuated by the second clutch.

According to the method of the present invention, sheet-like material is advanced through a former to form a three dimensional strip of padding, a first clutch is selectively engaged to transmit power from a motor to a coining mechanism to coin the strip and a second clutch is selectively engaged to transmit power from a motor to a cut-off mechanism.

The present invention provides the foregoing and other features hereinafter fully described and particularly pointed out in the claims, the following description and annexed drawings setting forth in detail certain illustrative embodiments of the invention, these embodiments being indicative, however, of but a few of the various ways in which the principles of the invention may be employed.

DETAILED DESCRIPTION

Figure 1:
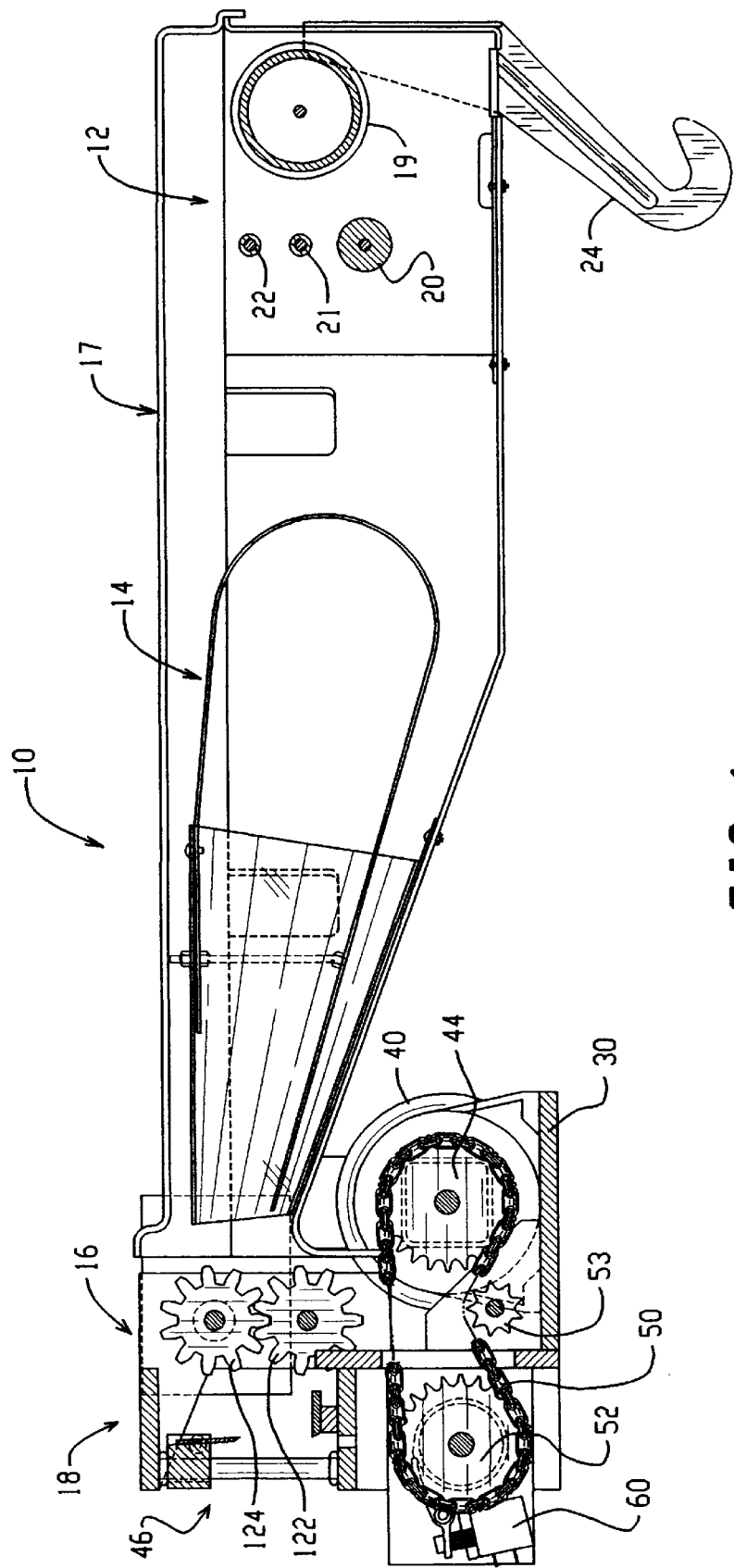
FIG. 1 is a side elevation view of a cushioning dunnage conversion machine constructed in accordance with the present invention.

FIG. 1 illustrates a cushioning conversion machine 10 constructed in accordance with the present invention. The conversion machine 10 includes a stock supply assembly 12, a forming assembly 14, and a feed/connecting and cut-off assembly 16, the latter hereinafter also being more simply referred to as the feed and cut assembly. In the illustrated embodiment, the stock supply assembly 12 and forming assembly 14 are associated with a former unit 17 while the feed/connecting and cut-off assembly are associated with a head unit 18, this being similar to the arrangement described in U.S. Pat. application No. 08/386,355, filed Feb. 8, 1995, assigned to the assignee of the present application.

In use, the conversion machine 10 processes sheet-like stock material to form dunnage which may be used for packing or shipping purposes. Commonly, the sheet material may consist of two or three superimposed plies or layers of biodegradable, recyclable, and reusable 30 to 50 pound Kraft paper which is supplied in a roll. The illustrated conversion machine 10 converts this stock sheet material into a continuous unconnected strip with lateral pillow-like portions separated by a thin central band. This strip is connected as by coining along the central band to form a connected, or coined, strip which may be cut into sections of a desired length.

The stock supply assembly 12 may include a constant entry roller 19 and various bars or rollers 20–22 for separating the layers of sheet material and feeding it into the forming assembly 14. The stock supply assembly 12 may also include a holder 24 which may support a roll of sheet material. Alternatively, the sheet material may be fed into the stock supply assembly 12 from a separate stand holding the sheet material, or by other suitable means.

The forming assembly 14 is similar to that shown in the previously mentioned U.S. Pat. application No. 08/386,355. As the sheet material passes through the forming assembly 14, it is formed into a continuous unconnected strip of padding. While the forming assembly 14 is preferably like that shown in U.S. Pat. application No. 08/386,355, the entire disclosure of which is incorporated herein by reference, other forming assemblies are also usable in the practice of the present invention. Reference may be had to said application for further details of the illustrated former unit 17.

The head unit 18 includes a frame 30 to which the various components of the feed and cut assembly 16 are mounted. Although not shown, the head unit preferably has an outer casing or shell enclosing the various components of the feed and cut assemblies. The former unit 17 may be connected to the head unit in the manner illustrated in the aforesaid '355 application.

Figure 2:
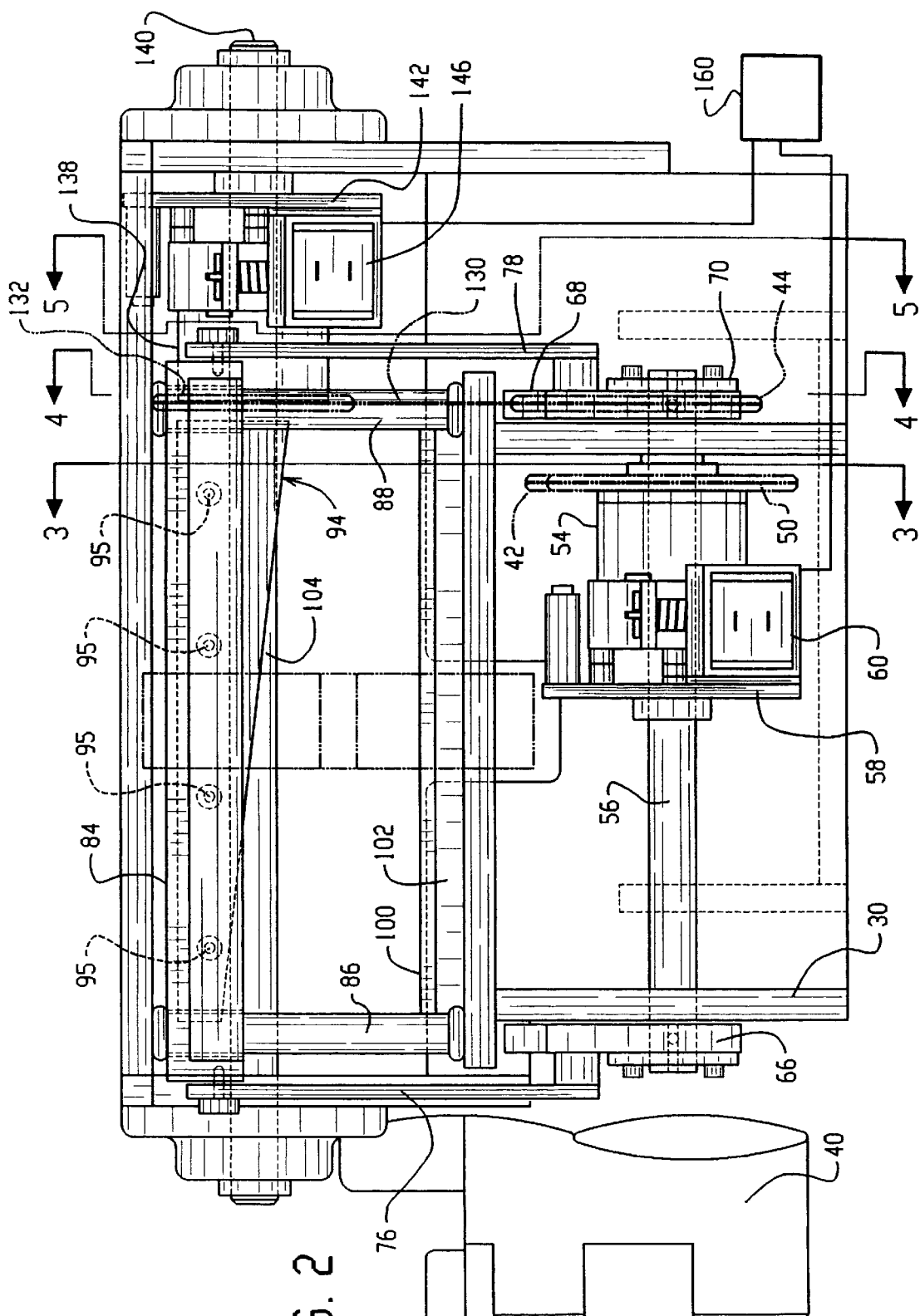
FIG. 2 is a front end view looking in the direction of arrows 2—2 of FIG. 1.
Figure 5:
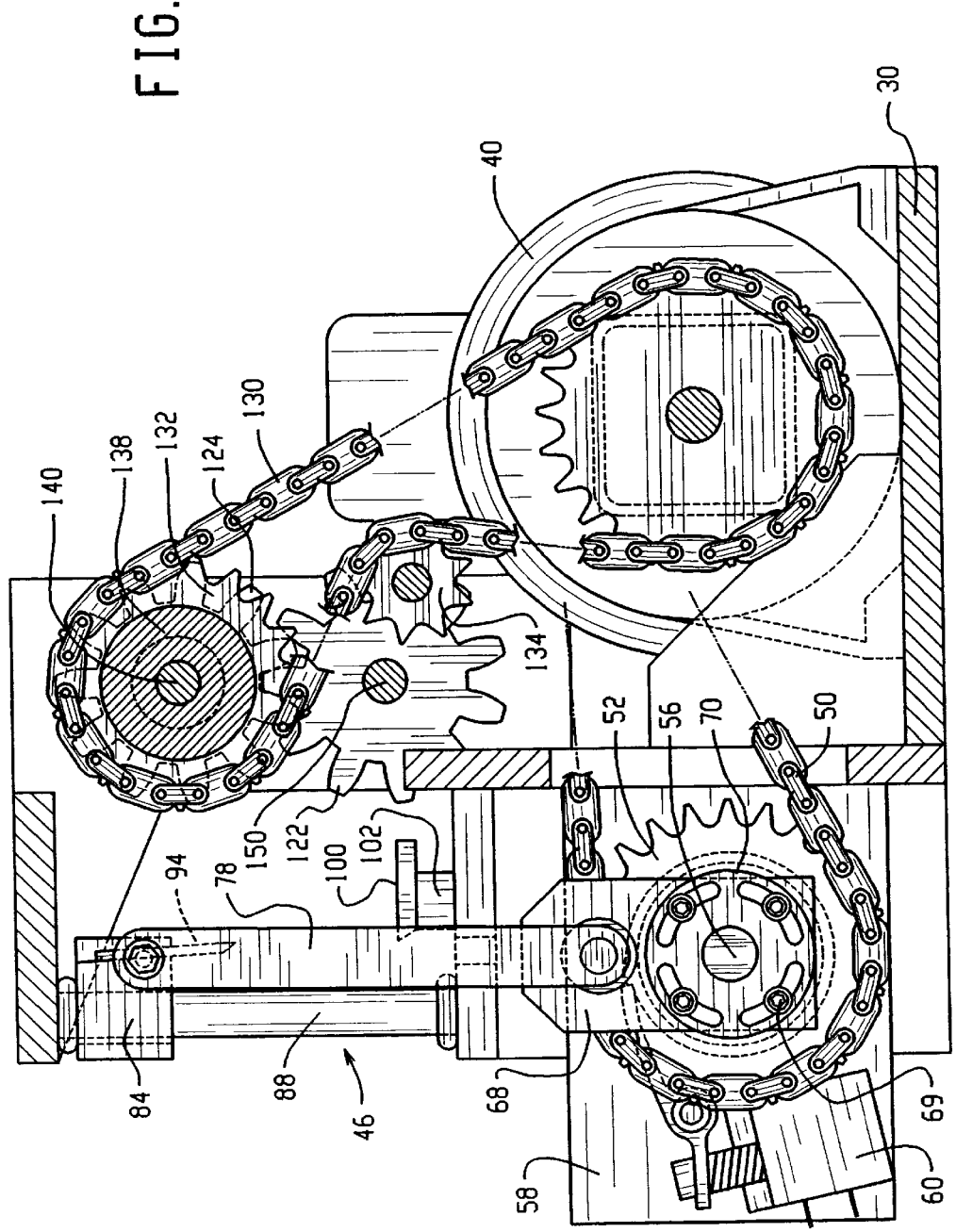
FIG. 5 is a side elevation view, partially in section, looking in the direction of arrows 5—5 of FIG. 2, showing a cutter in its top dead center position.

The feed and cut assembly 16 includes a motor 40 fastened to the frame 30. The shaft of the motor 40 drives a pair of output sprockets 42 and 44 (FIG. 2). The inner sprocket 42 (FIG. 3) provides the drive to power the cut-off mechanism 46 (FIG. 1). The sprocket 42 drives a chain 50 (FIGS. 1, 2 and 5) which in turn drives sprocket 52 (FIG. 5). An adjustable take-up idler sprocket 53 may be provided to maintain the desired tension in chain 50 and facilitate assembly and repair of the machine 10.

Figure 3:
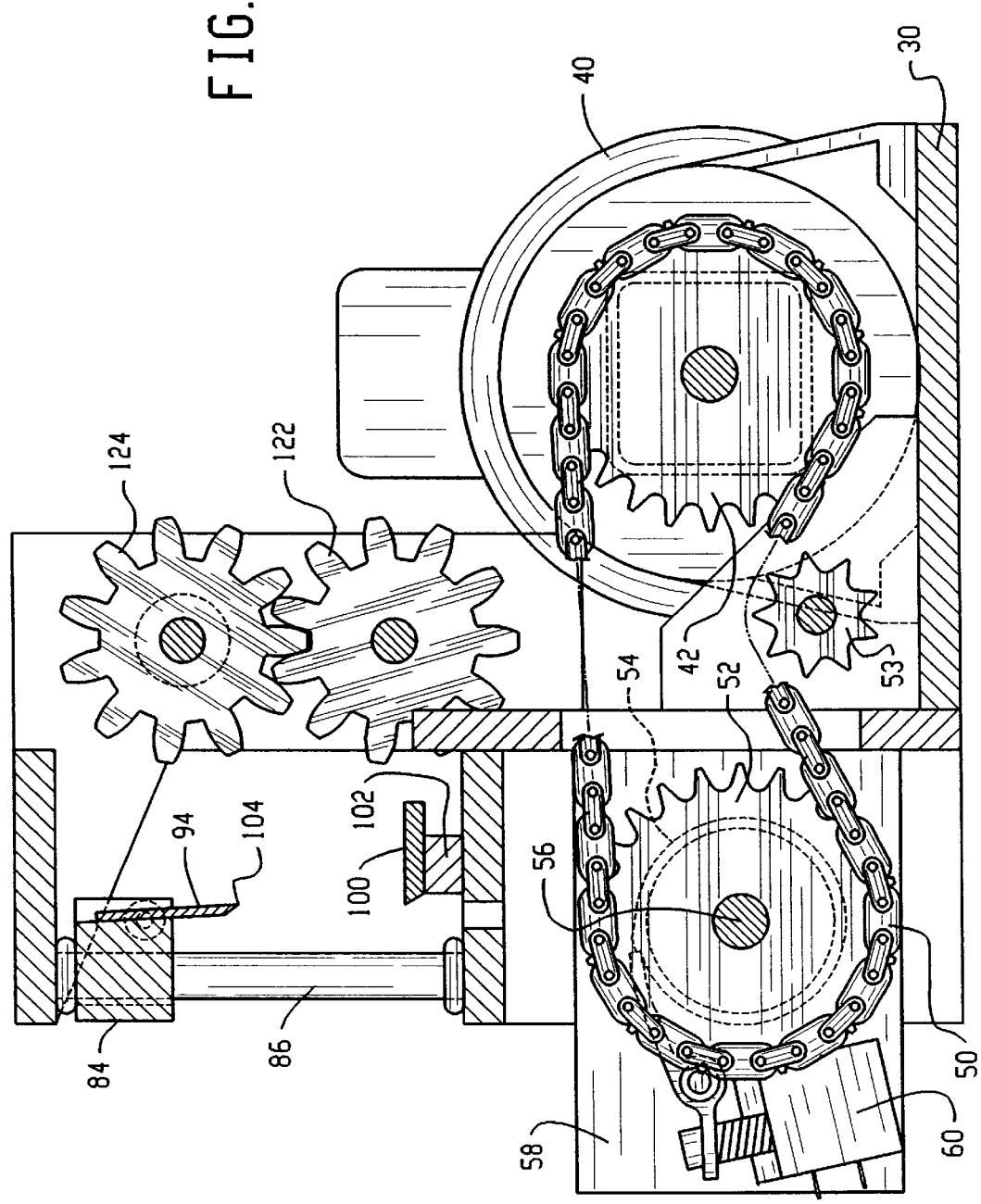
FIG. 3 is a side elevation view, partially in section, looking in the direction of arrows 3—3 of FIG. 2.

The sprocket 52 is connected to the input of a conventional wrap spring clutch 54 (FIGS. 2 and 3). The output of the wrap spring clutch 54 is through shaft 56. Shaft 56 is mounted in bearings (not shown) in the frame 30. The wrap spring clutch 54 is anchored by means of plate 58 to frame 30. When the wrap spring clutch 54 is engaged, rotation of the sprocket 52 is transmitted to shaft 56. Engagement of the wrap spring clutch 54 is accomplished by providing a signal to solenoid 60 which is a part of the clutch.

The clutch 54 is a single revolution clutch. When a pulse signal is provided to the solenoid 60, the clutch is engaged for a single revolution, and then it is disengaged. As will be clear from what follows, this arrangement permits the cut-off mechanism 46 to complete a single cutting operation.

The cut-off mechanism 46 includes a pair of crank arms 66 and 68 (FIGS. 2 and 5) mounted on opposite ends of shaft 56. The crank arm 68 is mounted by fasteners 69 to a hub 70 which in turn is fixed to shaft 56 at its right-hand end as viewed in FIG. 2. The crank arm 68 includes arcuate slots 72 which permit the angular position of the crank arm 68 to be adjusted with respect to the shaft 56 and hub 70. The crank arm 66 (FIG. 2 only) is similarly mounted to the opposite end of the shaft 56. The arcuate slots 72 permit adjustment of the crank arms so that they may be brought into precise parallel alignment. Also, the angular position of the cranks may be adjusted so as to locate the moving blade at the top of its stroke at the stop position of the clutch.

The crank arms 66 and 68 each drive a connecting rod, 76 and 78, respectively (FIG. 2). The connecting rods 76 and 78 (FIG. 2) are journalled to their respective crank arms in a conventional manner. The distal end of each of the connecting rods, 76 and 78, is connected to an opposite end of a cut-off blade mounting bar 84 by conventional pivotable connections. The cut-off blade mounting bar 84 is slidably mounted on guide rods 86 and 88 which are connected to the frame 30. The arrangement is such that when the shaft 56 rotates, the crank arms 66 and 68 drive the cut-off blade mounting bar 84 in a reciprocating motion along the guide rods 86 and 88 to cut off the formed strip of padding passing through the machine 10.

Figure 6:
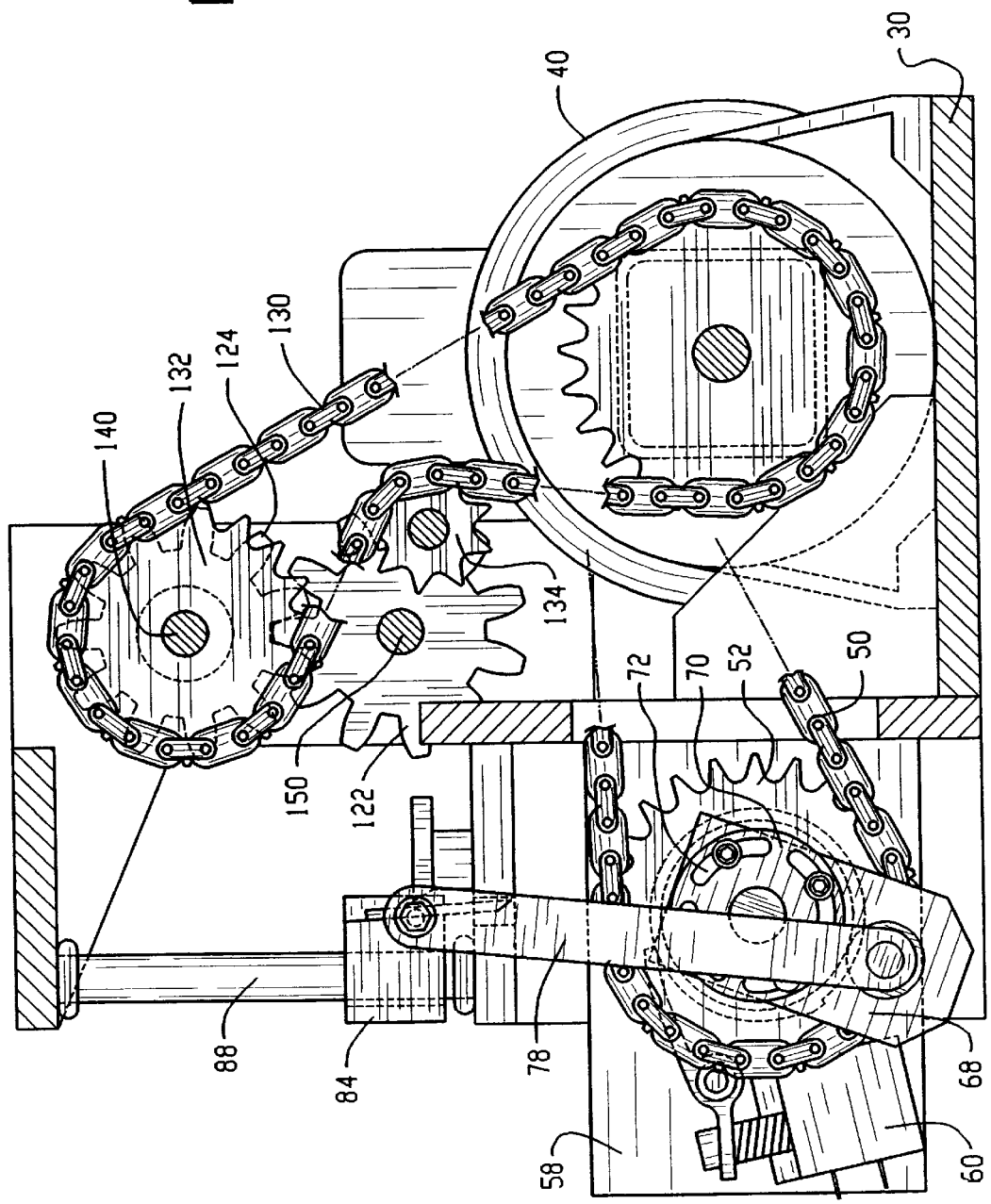
FIG. 6 is a view similar to FIG. 5 but showing the cutter in its bottom dead center position.

The cut-off blade mounting bar 84 carries a blade 94. The blade 94 is secured to the mounting bar 84 by conventional threaded fasteners 95. The cut-off blade 94 cooperates with a fixed cutter blade 100 which is mounted by means of a support 102 (FIG. 5) to the frame 30. When the cut-off blade mounting bar 94 moves downward from the position shown in FIG. 5 to the position shown in FIG. 6, the movable cutter blade 94 moves past the leading edge of the fixed cutter blade 100, shearing off any material which is between them. To facilitate this cutting action, the movable cutter blade 94 has a cutting edge 104 which is angled with respect to mounting bar 84. This causes the cutting action when movable blade 94 moves past the edge of the fixed blade 100 to occur progressively across the width of the material being cut. As is apparent, a single revolution of the shaft 56 occasioned by actuation of clutch 54 causes the blade 94 to travel through a complete single cycle moving from its top dead center position (FIGS. 2 and 5) through its bottom dead center position (FIG. 6) and back to its top dead center position, cutting any padding against the fixed blade 100.

Figure 4:
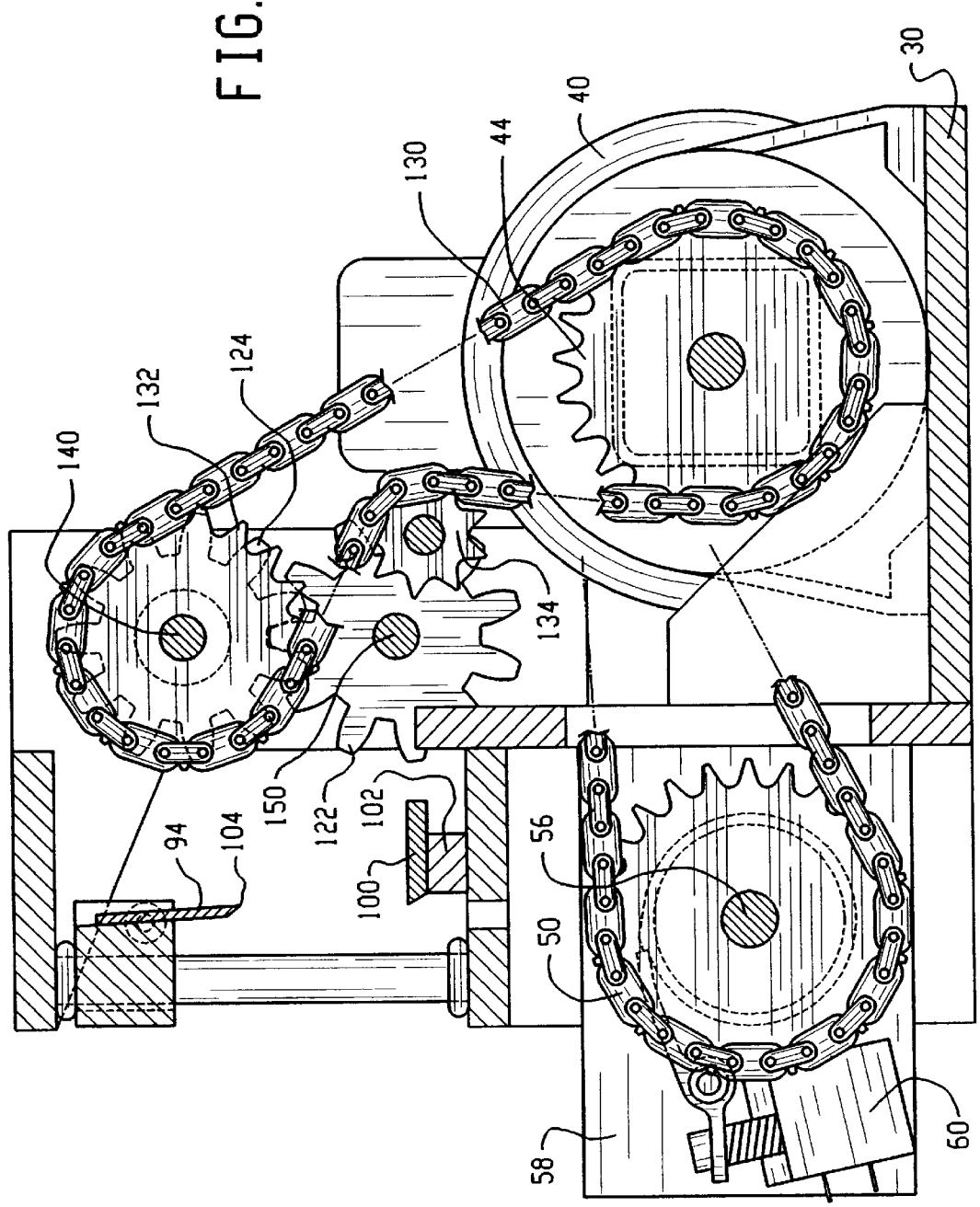
FIG. 4 is a side elevation view, partially in section, looking in the direction of arrows 4—4 of FIG. 2.

As discussed above, the motor 40 (FIG. 2) drives two sprockets, the inner one of which, 42, drives the cut-off mechanism. The outer sprocket 44 drives the feed mechanism 120 (FIGS. 1 and 4). The feed mechanism 120 includes a pair of mating gears 122 and 124 (FIGS. 2 and 4) which serve both to advance the sheet material through the conversion machine 10 and to connect overlapped portions of strip along a center band, the center band being coined and/or perforated by the gears as in the manner described in greater detail in U.S. Pat. No. 4,968,291. The gear 124 is driven through a chain-and-clutch arrangement similar in some, respects to that used to drive the cutoff mechanism 46. The outer motor sprocket 44 drives a chain 130 which in turn drives a sprocket 132. An adjustable take-up idler sprocket 134 may be provided to maintain the appropriate tension in the chain 130.

The sprocket 132 is fastened to the input of a wrap spring clutch 138 (FIGS. 2 and 5). The wrap spring clutch 138 is mounted on shaft 140 which is rotatably mounted at its opposite ends in the frame 30 by suitable bearings. The nonrotating parts of wrap spring clutch 138 are mounted to plate 142 (FIG. 2) which is also secured to the frame 30. The output of the wrap spring clutch 138 is connected to the shaft 140. When the spring clutch 138 is engaged by the application of an appropriate signal to solenoid 146, the shaft 140 is driven. Thus actuating the solenoid 146 causes the rotation of the motor 40 to drive the shaft 140.

Gear 124 is fixed to the shaft 140. Accordingly, when the motor 40 turns and the clutch 138 is engaged, the gear 1 24 rotates. Gear 122 is rotatably mounted on a shaft 150 with its teeth in intermeshing engagement with the teeth of gear 124. The shaft 150 is mounted in an adjustable mechanism which permits the shaft 150 to move vertically as viewed in the drawings toward or away from gear 124. The details of the mounting mechanism for shaft 150 is shown in detail in U.S. Pat. application No. 08/386,355. Suffice it to say the shaft 150 is mounted to position the gear 122 to achieve the desirable coining effect as the sheet material is advanced through the conversion machine 10.

The conversion machine 10 may be provided with a suitable control mechanism 160 (FIG. 2) for the operating spring clutches 54 and 138. The control 160 is connected to the solenoids 60 and 146 to selectively apply current so as to engage the clutches 54 and 138 as required. A limit switch (not shown) may be provided as part of this control mechanism. The limit switch is positioned to close only when the cut-off blade mounting bar 84 is in its top dead center position shown in FIG. 5. Only when the limit switch is closed can the wrap spring clutch 138 be actuated to advance the paper and coin the cushioning product. This assures that material will not be advanced through the machine 10 unless the movable cutter blade 94 is clear of the path of advancing material.

While the clutches 54 and 138 are preferably wrap spring clutches, other mechanical devices could be used, such as friction clutches or selectively interengageable dogs on the drive and driven elements could be used so long as they operate to selectively connect the drive motor 40 to the cut-off mechanism 46 and the feed mechanism 120. More particularly, the clutch 138 may be an electromagnetic clutch, or other type of clutch or device, which enables the gears 122 and 1 24 to be reversely rotated as may be needed, for example, to clear a jam. If a reversible motor is used, then rotation of the gears may be reversed by reversing the rotation direction of the motor, in which event the clutch 138 is of a type operable in either rotation direction to effect selective coupling of the motor to the gears regardless of the rotation direction of the motor. It will be appreciated that the coupling between the moving blade of the cut-off mechanism 46 may be adapted to allow reversal in direction of the motor or other drive component to which the moving blade is selectively connected, as by the clutch 54. In the illustrated embodiment, the sprocket 42 may be connected to the shaft of the motor 40, or the sprocket 52 may be connected to the input of the clutch 54, by a one-way coupling (such as overrunning bearings, one-way clutch, etc.). In an alternative embodiment, the wrap spring clutch 54 may be replaced, for example, by an electromagnetic clutch preferably in combination with a fail-safe brake that may be, for example, a spring-loaded electromagnetic brake. When a cutting operation is to be performed, both the clutch and brake are energized respectively to connect the moving blade of the cut-off mechanism to the motor and to release the brake. Upon completion of the cutting stroke, as may be determined by a limit switch or otherwise, the clutch and brake are de-energized respectively to disconnect the moving blade of the cut-off mechanism from the motor and to engage the brake.

In addition, although the forming assembly 14 has been described in a preferred embodiment, other arrangements are possible and known in the art. It is a feature of the present invention that the forming assembly 14 supply a strip of padding material that requires coining and cutting to desired length to form individual pads. Moreover, the sheet-like material may be advanced through the machine 10 either by the combined coining and feeding function of gears 122 and 124 as shown, or separate feed rollers can be used to advance the material, while coining is accomplished by gears 122 and 124.

Although the invention has been shown and described with respect to certain preferred embodiments, it is obvious that equivalent alterations and modifications will occur to others skilled in the art upon the reading and understanding of this specification. The present invention includes all such equivalent alterations and modifications.

What is claimed is:

1. A cushioning conversion machine for converting sheet-like material into a dunnage product, said machine comprising a forming assembly with guides to form the sheet material into a continuous three dimensional strip of dunnage; and a feed and cut-off assembly including a drive motor,
first and second clutches operatively connected to the drive motor,
a feed mechanism to advance the sheet material through the forming assembly; and
a cut-off mechanism to cut the strip of dunnage into cut strips of desired length;

the first clutch selectively connecting the feed mechanism and the second clutch selectively connecting the cut-off mechanism to the drive motor;

wherein the cut-off mechanism includes a blade mounting bar which carries a blade, a pair of connecting rods having distal ends connected to opposite ends of the mounting bar, and a pair of crank arms operably coupled to respective connecting rods and an output shaft of the second clutch to drive the connecting rods to move the blade mounting bar in a reciprocating motion.

2. The machine of claim 1 wherein at least one of the first and second clutches is a wrap spring clutch.

3. The machine of claim 1 wherein the feed and cut-off assembly includes a pair of gears intermeshing with each other and positioned to receive the formed sheet material into the nip defined by the gears as the sheet material leaves the forming mechanism.

4. The machine of claim 3 wherein the first clutch is operatively connected to at least one of the pair of gears so as to cause the gear to rotate when the first clutch is engaged.

5. The machine of claim 4 wherein the gears feed the sheet material through the forming assembly.

6. The machine of claim 4 wherein the cut-off mechanism includes a an opposed pair of knife edges and at least one of the knife edges is connected to the second clutch to cause the knife edges to sheer the sheet material when the second clutch is engaged.

7. The machine of claim 6 wherein the second clutch is connected to a crank mechanism, and said clutch drives the crank mechanism through one complete revolution each time the second clutch is engaged.

8. The machine of claim 6 wherein the knife of the cut-off mechanism is located downstream of the gear pair of the feed mechanism.

9. The machine of claim 8 including a controller connected to the first and second clutches, the controller being operative selectively to control operation of said first and second clutches.

10. The machine of claim 9 wherein the controller includes a switch to prevent engagement of the first clutch when the knife edges are in contact with each other.

11. The machine of claim 1, wherein the crank arms are mounted to hubs fixed to opposite ends of the output shaft of the second clutch.

12. The machine of claim 1, wherein the cut-off mechanism further comprises a pair of guide rods on which the blade mounting bar is slidably mounted.

13. The machine of claim 1, wherein the cut-off mechanism further comprises a fixed blade which coats with the blade on the blade mounting bar to cut the strip of dunnage.

14. The machine of claim 1, wherein a single rotation of the output shaft of the second clutch moves the blade mounting bar and thus the blade from a top dead center position through a bottom dead center position and back to the top dead position.

15. A method of converting a sheet-like material into dunnage comprising the steps of advancing the sheet-like material through a former to form a continuous three dimensional strip of dunnage, selectively engaging a first clutch to connect a drive motor to a coining mechanism to coin the strip so as to maintain the three-dimensional shape into which it has been formed, selectively engaging a second clutch to connect a drive motor to a cut-off mechanism to cut strip of dunnage to a desired length.

16. The method of claim 15 including disengaging the first clutch before engaging the second clutch.

17. The method of claim 16 further including the step of supplying the sheet-like material from a web of such material.

18. The method of claim 15 wherein the step of selectively engaging a first clutch and the step of selectively engaging a second clutch include the step of selectively engaging the first and second clutches with a single drive motor.

19. The method of claim 15, including the step of reversing the drive direction of the motor and selectively engaging the first clutch.

* * * * *